(12) United States Patent
Schmidt et al.

(10) Patent No.: US 12,097,797 B2
(45) Date of Patent: Sep. 24, 2024

(54) MOTOR VEHICLE AND METHOD FOR OPERATING AN ILLUMINATION DEVICE OF A MOTOR VEHICLE

(71) Applicant: AUDI AG, Ingolstadt (DE)

(72) Inventors: Valentin Schmidt, Neuburg a.d. Donau (DE); Michael Flachhuber, Freystadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 18/248,352

(22) PCT Filed: Sep. 15, 2021

(86) PCT No.: PCT/EP2021/075292
§ 371 (c)(1),
(2) Date: Apr. 7, 2023

(87) PCT Pub. No.: WO2022/073733
PCT Pub. Date: Apr. 14, 2022

(65) Prior Publication Data
US 2023/0373383 A1 Nov. 23, 2023

(30) Foreign Application Priority Data
Oct. 7, 2020 (DE) ..................... 10 2020 126 251.5

(51) Int. Cl.
*B60Q 1/00* (2006.01)
*B60Q 1/22* (2006.01)
(Continued)

(52) U.S. Cl.
CPC ............ *B60Q 1/0035* (2013.01); *B60Q 1/22* (2013.01); *B60Q 1/247* (2022.05); *B60Q 1/2603* (2013.01);
(Continued)

(58) Field of Classification Search
CPC ...... B60Q 1/0035; B60Q 1/507; B60Q 1/547; B60Q 1/543; B60Q 1/509; B60Q 1/263;
(Continued)

(56) References Cited

U.S. PATENT DOCUMENTS 9,359,009 B2 6/2016 Ignaczak et al.
10,343,593 B2 7/2019 Kamhi et al.
(Continued)

FOREIGN PATENT DOCUMENTS

DE 102012219572 A1 4/2014
DE 102013012891 A1 2/2015
(Continued)

OTHER PUBLICATIONS

Innovation Q+ NPL Search (Year: 2023).*
(Continued)

*Primary Examiner* — Anabel Ton
(74) *Attorney, Agent, or Firm* — Sterne, Kessler, Goldstein & Fox P.L.L.C.

(57) ABSTRACT

The present disclosure relates to a motor vehicle, comprising an illumination device, which comprises a plurality of light sources and a control device for illuminating an illumination region which can be simultaneously illuminated and which completely covers the surroundings of the motor vehicle in the circumferential direction. The illumination region is divided by the control device into illumination segments, which are controllable independently for illumination as part of at least one light function, in particular an assisting light function, of a vehicle system, wherein the illumination region of the illumination device has at least two illumination segments, one following the other in a spacing direction from the motor vehicle.

19 Claims, 3 Drawing Sheets

(51) Int. Cl.
  *B60Q 1/24* (2006.01)
  *B60Q 1/26* (2006.01)
  *B60Q 1/50* (2006.01)
  *B60Q 9/00* (2006.01)

(52) U.S. Cl.
  CPC ............. *B60Q 1/507* (2022.05); *B60Q 1/509* (2022.05); *B60Q 1/543* (2022.05); *B60Q 1/547* (2022.05); *B60Q 9/007* (2013.01); *B60Q 2400/20* (2013.01); *B60Q 2400/40* (2013.01); *B60Q 2900/40* (2022.05)

(58) Field of Classification Search
  CPC ............ B60Q 2900/40; B60Q 2900/20; B60Q 2400/20; B06Q 9/007
  See application file for complete search history.

(56) References Cited

U.S. PATENT DOCUMENTS

| | | |
|---|---|---|
| 11,414,008 B2 | 8/2022 | Wickramasinghe et al. |
| 11,518,300 B2 | 12/2022 | Kasuga et al. |
| 2005/0117364 A1 | 6/2005 | Rennick et al. |
| 2017/0210282 A1 | 7/2017 | Rodriguez Barros |
| 2017/0267167 A1 | 9/2017 | Sakata et al. |

FOREIGN PATENT DOCUMENTS

| | | | |
|---|---|---|---|
| DE | 102015214682 A1 | 2/2017 | |
| DE | 112014006870 T5 | 5/2017 | |
| DE | 102016210512 A1 * | 6/2017 | ............. B60K 35/00 |
| DE | 102017101420 A1 | 7/2017 | |
| DE | 112017001383 T5 * | 11/2018 | ............... B60Q 1/24 |
| DE | 102018124896 A1 | 4/2019 | |
| DE | 102018206040 A1 | 10/2019 | |
| DE | 102018206042 A1 | 10/2019 | |
| DE | 112017007499 T5 | 4/2020 | |
| EP | 1916153 A2 | 4/2008 | |
| EP | 3090900 A1 | 11/2016 | |
| WO | WO 2018/103878 A1 | 6/2018 | |

OTHER PUBLICATIONS

International Search Report of the International Searching Authority directed to related International Patent Application No. PCT/EP2021/075292, mailed Dec. 1, 2021, with attached English-language translation; 7 pages.

International Preliminary Report on Patentability directed to related International Patent Application No. PCT/EP2021/075292, mailed Mar. 28, 2023, with attached English-language translation; 20 pages.

* cited by examiner

MOTOR VEHICLE AND METHOD FOR OPERATING AN ILLUMINATION DEVICE OF A MOTOR VEHICLE

TECHNICAL FIELD

The present disclosure relates to a motor vehicle, comprising an illumination device, which comprises a plurality of light sources and a control device for illuminating an illumination region which can be simultaneously illuminated and which completely covers the surroundings of the motor vehicle in the circumferential direction, wherein the illumination region is divided into illumination segments, which are controllable independently by means of the control device for illumination as part of at least one light function, in particular an assisting light function, of a vehicle system. In addition, the present disclosure relates to a method for operating an illumination device of a motor vehicle.

BACKGROUND

Lighting devices for motor vehicles that fulfill a purpose to be fulfilled for motor vehicles in accordance with, in particular, legal requirements have been known for a long time. Here, for example, headlights, direction indicators, rear lights, brake lights and similar can be mentioned. Recently, however, illumination devices designed to illuminate areas under and/or near the motor vehicle have also become more popular, for example as part of assisting light functions. Such illumination devices are often used to stage one's own motor vehicle, in such a manner that the functionality is limited to flashing, pulsing, color changing or permanent illumination, for example. Neon tubes and/or LED strips, for example, can be used as light sources, especially when used for tuning a motor vehicle.

In the state of the art, some approaches have already been known to use such a "close-range light" also for the implementation of communicating and/or assisting light functions. DE 10 2017 101 420 A1 relates to a luminescent vehicle molding. In this case, a lighting device is disclosed extending along a perimeter of a body panel partially around a motor vehicle. The lighting device comprises at least one light source, wherein the light of the light source is projected in such a manner that an area in the vicinity of the vehicle is illuminated. Thus, a region in the vicinity of a vehicle can be illuminated and the illumination can be controlled in such a manner that improved illumination for one or more camera or driver support systems of the vehicle is provided.

DE 10 2018 206 040 A1 relates to a method for communication of a motor vehicle with a road user. The communication takes place in such a manner that the road user is informed about a planned maneuver of the motor vehicle or an imminent door opening of the motor vehicle and/or that the motor vehicle has recognized the other road user. In the method, at least one optically visible appearance is produced on a drivable surface and/or on the motor vehicle itself. The optically visible appearance may include a fully illuminated light segment, wherein the optically visible appearance may be formed on at least one display or light generating device that extends longitudinally around or nearly around the motor vehicle. A comparable disclosure is also found in DE 10 2018 206 042 A1, in which the optically visible appearance for an intended lane change of the motor vehicle is described.

EP 1 916 153 A2 relates to a method for displaying information, in which at least one projection object is generated at a projection location outside a motor vehicle by means of a projection means provided on the motor vehicle. At least one expected future location of the motor vehicle, for example a parking space, is marked at least in a planar manner by at least one generated projection object.

BRIEF DESCRIPTION OF DRAWINGS/FIGURES

DETAILED DESCRIPTION

Figure 1:
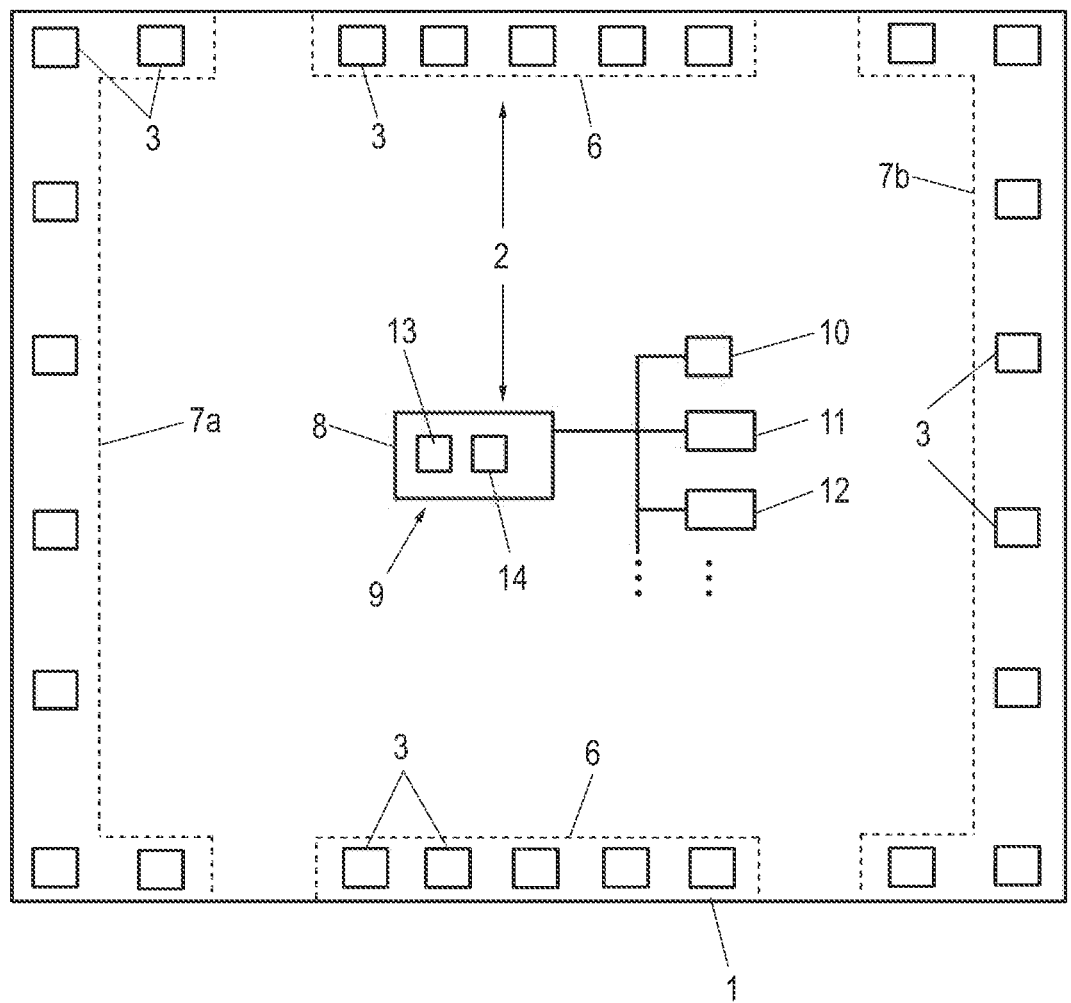
FIG. 1 illustrates a schematic diagram of a motor vehicle, in accordance with some embodiments.

The present disclosure is therefore based on the object of specifying an improved motor vehicle, in particular with regard to the usefulness for assisting light functions.

In order to achieve this object, it is provided according to the present disclosure in a method of the type mentioned at the beginning that the illumination region of the illumination device has at least two illumination segments following one after the other in a spacing direction from the motor vehicle.

In this case, a particularly advantageous embodiment is provided when the illumination region, preferably in the form of a matrix, is divided into illumination segments that follow one after the other in the circumferential direction and the spacing direction, wherein in particular each segment can cover a predefined circumferential and spacing region. Nevertheless, as will be explained later, a segmentation of an illumination device relating to the immediate vicinity around the motor vehicle that is present only in the spacing direction, i.e. in a direction away from the motor vehicle, can also be used advantageously, in particular for assisting light functions of a vehicle system. In this context, it should also be noted in general that the control device can also be at least partially part of the vehicle system, wherein the vehicle system is of course part of the motor vehicle.

According to the present disclosure, a distance-dependent segmented illumination of the surroundings close to the vehicle is therefore proposed, which makes it possible to implement a series of assisting, communicating and/or staging light functions. A particularly high degree of flexibility and variation is achieved by using an illumination device with several light sources that define a simultaneously illuminable illumination region completely covering the vicinity of the motor vehicle in the circumferential direction around the motor vehicle, which contrasts, for example, with a pure projection means limited to a local segment. The illumination segments can be controlled independently by the control device, which means that, for each illumination segment, it can be decided individually in the control device whether or not it is to be illuminated in a current situation. In this manner, many different illumination patterns can be produced, in order to provide a wide variety of assisting light functions, as described, in particular those which benefit from the segmentation in the spacing direction, as will be explained in more detail below. In this case, the circumferential direction is to be understood as the direction surrounding the motor vehicle, for example following an envelope, in particular smoothed, of the outer shape of the motor vehicle. The spacing direction can, for example, be at least substantially perpendicular to the circumferential direction and, like the circumferential direction, is of course to be defined locally in each case. The spacing direction can, for example, be perpendicular to the particularly smoothed envelope of the motor vehicle. On account of local spacing directions which are at an angle to one another, in particular also angular segment-like segments, in particular extending outwards, can be present, in particular in the case of a matrix-like, preferred segmentation of the illumination region.

The individual, independently controllable illumination segments can be realized by means of different technologies and approaches, as they are generally known in the prior art. Illumination segments can each be defined by the arrangement of at least one light source assigned to them and/or the, in particular at least partially controllable, setting of an optical component assigned (or associated) to the light source assigned to the illumination segment. In other words, the segmentation of the illumination region is realized by the arrangement of the light sources and/or the setting of at least one optical component assigned (or associated) to the at least one light source and/or the activation of the light sources and/or the at least one optical component by the control device. Optical components can comprise, for example, lenses, apertures, in particular matrix-like microaperture arrangements, light guides and similar. Several light sources and/or optical components can be assigned to one illumination segment; conversely, it is also conceivable to assign a single light source and/or optical component to several illumination segments with appropriate control. In general, illumination segments, in particular in edge regions, can overlap partially, but not completely. It can be advantageous, but not absolutely necessary, if illumination segments are defined as sharply as possible in particular along their edge, for example in the manner of a projection. The illumination segments can then be particularly advantageously directly adjacent to one another. The at least one light source assigned to an illumination segment and/or the at least one assigned (or associated) optical component can in particular form a projector for projecting a defined, in particular sharply delimited light surface onto the ground of the surroundings of the motor vehicle, wherein the light surface then corresponds to the illumination segment.

In this case, the illumination device is particularly advantageously used to illuminate a close range of the surroundings around the motor vehicle and ideally begins as close as possible to the motor vehicle or even under the motor vehicle. Specifically, it can be provided, for example, that the illumination region in the spacing direction has a spacing expansion from the motor vehicle starting from 0 to 0.2 meters and/or ending at 0.5 to 3.5 meters. In this case, it is conceivable in principle to define a fixed spacing interval around the motor vehicle, but due to the common geometries of motor vehicles, it will be more common if starting value and final value of the covered spacing interval vary locally in the circumferential direction, for example within the specified ranges for the start value and/or the end value. Essential is a distance-dependent segmentation of the peripheral area close to the vehicle with functional reference. A range of approximately 0 centimeters (or less, that means, starting under the motor vehicle) up to 3 meters around the host motor vehicle is sufficient for imaging the many useful light functions.

As already mentioned, the illumination device provided according the present disclosure is concerned with the complete circumferential illumination of the surroundings, in particular those immediately adjacent to the motor vehicle and in the vicinity of the vehicle.

Therefore, the illumination device differs significantly from further lighting devices of the motor vehicle. The motor vehicle can usually have these in addition, which means that the motor vehicle can in particular have, in addition to the illumination device, at least one headlight device and/or a direction indicator device and/or a rear light device and/or a reversing light and/or a brake light device and/or a license plate light and/or a position light device. The motor vehicle can also comprise interior illumination devices for illuminating an interior of the motor vehicle.

In summary, a distance-dependent segmentation of the illumination region, i.e. in the spacing direction, is thus provided, which allows various new assisting and/or communicating light functions, for example with regard to the distance-related amplification of intensities, the dynamic highlighting of directions or the local illumination of objects. In particular, in addition to a segmentation in the circumferential direction, the local resolution is additionally refined. This is because the segmentation in the circumferential direction, which can also be referred to as angle-dependent segmentation, enables, for example, the targeted highlighting of objects, the addressing of objects in certain directions or the more flexible dynamic control of stagings.

Generally speaking, the number and specific characteristics of the illumination segments can be individually adapted to the functional requirements of the respective light functions. In this respect, the range extends from successive rings of light around the motor vehicle in the spacing direction to a high-resolution projection field, in particular defining individual pixels as illumination segments, in a part of the illumination region or even across the entire illumination region.

By coupling with the assisting and/or communicating light functions of the at least one vehicle system, an ambient illumination is ultimately used to provide a visually appealing implementation of the at least one assisting and/or communicating light function in particular.

Conceivable light functions are described in more detail below and include, for example, an environmentally sensitive adaptive intensity variation, an approach light, a coming home function, a theft warning, a distance recommendation with respect to another road user, a reminder light, an animated or static direction of travel indicator, periphery lighting for a subsequent journey, highlighting of danger points, various indications also for communicating with other road users, in particular to inform them that pedestrians have been detected and/or the motor vehicle is about to move off, a charging completion indicator, a charging start indicator, a charging point illumination, a charging status indicator, a leaving home function, an emergency light, an indication of a panic mode, a puddle light, a maneuvering light, a lateral distance indication, a reversing light, a lane merging assistant, a synthetic cornering light, especially related to reversing, a trajectory projection, a support of an incomplete street lighting, a right-of-way light, an animated warning blinker, a door opening light and markings of the motor vehicle as an obstacle adapted to the situation (sidelight or parking light).

The light sources can comprise at least one LED and/or at least one laser light source and/or at least one projector. At least one optical component can also belong to a projector as a light source. Preferably, the light sources can be at least partially incorporated in at least one sill and/or a front apron and/or a rear apron and/or an underbody and/or at least one bumper and/or in at least one wheel arch and/or in a spoiler and/or in a radiator grille. Integration in the underbody, sill, wheel arch, spoiler and/or front and rear apron is particularly preferred according to the present disclosure. In this manner, a generally preferred installation of the light sources in the motor vehicle, which is close to the ground, is also made possible, by means of which a beginning of the illumination region can at least partially be realized close to and/or even under the motor vehicle, in such a manner that the immediate close range around the motor vehicle can be illuminated as completely as possible. In principle, another installation of the light sources in the motor vehicle close to the ground is also conceivable, but preferably an arrangement of the light sources in the lower third of the motor vehicle, in particular in the lower 20% of the motor vehicle, should be sought. Further conceivable installation locations for the light sources, which are arranged higher, but nevertheless have proven advantageous for illumination of the near zone around the motor vehicle, are also conceivable. It can thus also be provided that at least a portion of the light sources are installed in at least one exterior mirror of the motor vehicle and/or in a tailgate of the motor vehicle and/or in at least one A-pillar and/or at least one B-pillar and/or at least one C-pillar and/or at least one door of the motor vehicle.

Particularly advantageously, the illumination device can be designed to illuminate at least a portion of the illumination segments in different light intensities and/or light colors. In particular, the light sources and/or the optical components are thus designed to controllably provide different light intensities (brightnesses) and/or light colors for at least the part of the illumination segments, wherein the control device is designed to independently control these illumination segments with respect to the light intensity and/or light color. In this manner, a further variety of expression options is added by the illumination device, which again provides a significantly more extensive flexibility and variation possibility, since different illumination segments can be illuminated with different, preferably steplessly dimmable, brightnesses and/or light colors. In addition to the preferred continuously variable dimmability of the illumination segments, for example via a pulse-width-modulated actuation of the light source, it is of course also possible to use fixedly predetermined, stepped light intensities. In order to realize different light colors, in addition to correspondingly suitable optical components, for example color filters, it is particularly advantageously also possible to use LED arrangements which, for example, can each contain a light-emitting diode for green light, for red light and for blue light, in such a manner that different light colors can be obtained by corresponding activation.

The control device is, in general, designed as a function of a requirement of the light function, in particular an assisting and/or communicating light function, for the segment-related control of the illumination device for implementing the light function. Specifically, for example, input information of the light function for determining illumination information can be evaluated, wherein the control device is designed to control the illumination device, that means in particular its light sources and optionally optical components, in accordance with the illumination information, for example by means of a control information derived from the illumination information. For this purpose, in a specific embodiment, the control device can have an evaluation unit for determining the illumination information and a control unit for controlling the illumination device in accordance with the illumination information. These can be implemented accordingly by hardware and/or software components, wherein the hardware components of the control device can comprise, for example, at least one processor and/or at least one storage means in which software components can also be stored. In particular, the evaluation unit and the control unit can at least partially be implemented in such a manner that they form a lighting algorithm, which is responsible for the function logic of the partial functions, reads necessary interface information, in particular as input information, and ultimately signals the required controlling of the light sources and, if applicable, optical components. The interfaces of the lighting algorithms that realize at least one light function to further software and/or hardware modules of the motor vehicle can be light function-dependent and/or can be expanded if necessary. Input information for determining the illumination information, i.e., in particular for the evaluation unit, can particularly advantageously comprise sensor data of at least one environment sensor of the motor vehicle, in such a manner that the light function can ultimately react to specific physical-technical conditions in the surroundings of the motor vehicle, in particular in the illumination region, or the light function can take into account the current driving situation or generally the operating situation. Environment sensors can include, for example, cameras, radar sensors, lidar sensors, ultrasonic sensors and similar. Other useful input data relate to ego data describing the current operating state of the host motor vehicle, wherein, moreover, for different light functions input information is conceivable, which goes beyond this pure description of the current operating situation of the motor vehicle by sensor data and/or operating data (ego data), for example personalization information describing a driver's request. Such personalization information can also be taken into account downstream of the determination of the illumination information during the control, for example during the determination of a control information.

Possible input information for the at least one light function can comprise, for example, a current speed of the motor vehicle, a terminal state, object information about environment objects (existence, class, position, . . . ), predictive route data, predicted or planned driving maneuvers, the ambient brightness, the amount of rain, the position of a light probe module, the operating state of a charging device for an electrical high-voltage battery of the motor vehicle, information about currently threatening hazards, the operating state of doors of the motor vehicle, seat occupancy information, direction indication information, parking light information, information of an anti-theft system, information of an installed emergency call system, panic mode information, an active driving profile, an active user profile, the position of a gear selection lever, and/or the steering angle.

The control device can be connected via at least one bus system of the motor vehicle to a plurality of components of the illumination device to be controlled, in particular to the light sources and/or at least one controllable optical component and/or to illumination modules comprising at least one light source and/or at least one controllable optical component. In this case, each illumination segment can be provided with one illumination module, for example, which can then be controlled independently. The control of the light sources and/or optical components and/or illumination modules then expediently takes place via vehicle-based bus systems, for example a LIN bus, a CAN bus, a CAN FD bus and/or an in-vehicle ethernet.

Particularly advantageously, the control device can be designed in the context of the light function for distance-related illumination and/or highlighting of an environment object and/or for the, in particular dynamic, display of a environment direction, in particular away from the motor vehicle or directed toward the motor vehicle, by different control of at least two illumination segments which are offset relative to one another in the spacing direction and/or for the display of an additional information to be displayed by illuminated intervals of the illumination region in the spacing direction. Consequently, the segmentation in the spacing direction enables the highlighting and/or illumination of environment objects, for example by selecting a specific distance range to be illuminated in the spacing direction, which comprises the environment object and/or is directly adjacent thereto. Of course, when illuminating and/or indicating environment objects, a combination with a segmentation in the circumferential direction is particularly suitable, in particular a matrix-like segmentation in the spacing direction and the circumferential direction. The term environment object is to be understood broadly in the context of the present disclosure, in particular as a generally environment object having a position and/or extent in a surrounding model of the motor vehicle, which can be both a physically actually existing environment object and a virtual environment object, for example a designated, defined surrounding area, in particular a surface portion. However, the segmentation in the spacing direction also allows a clearly improved presentation of environment directions starting from the motor vehicle, wherein, for example, different light intensities and/or light colors can follow one another in the spacing direction and/or even a temporal dynamics can be used, for example a kind of running light from the inside to the outside or from the outside inward, in such a manner that, in particular also in the case of a non-provided segmentation in the circumferential direction, a direction to the vehicle and a direction away from the vehicle as environment directions can be visualized. However, a combination with a segmentation in the direction of travel is preferred.

Finally, the segmentation in the spacing direction and advantageously also in the peripheral direction can also be used for outputting additional information, in particular a piece of communication information. In this case too, it is in principle already sufficient, for example in the form of light rings around the motor vehicle, to provide only a segmentation in the spacing direction, since, for example, a Parameter can then be displayed as additional information by a corresponding number of illuminated, therefore connected, illumination segments, in particular starting from the motor vehicle itself. Of course, even in the case of a matrix-like segmentation in the circumferential direction and the spacing direction, complex additional information is conceivable, up to texts, symbols and similar. Here too, the segmentation in the spacing direction proves to be particularly advantageous.

In addition to the motor vehicle, the present disclosure also relates to a method for operating an illumination device of a motor vehicle in accordance with the present disclosure in the context of the light function of the vehicle system, comprising the following steps:

evaluation of input information of the light function, comprising in particular sensor data of at least one environment sensor of the motor vehicle, for determining illumination information which describes at least one environment object to be illuminated and/or to be highlighted and/or at least one environment direction to be indicated and/or additional information to be indicated by illuminated intervals of the illumination region in the distance direction, controlling the illumination device in accordance with the illumination information for illuminating and/or highlighting the at least one environment object and/or for displaying the at least one environment direction and/or for displaying the additional information.

All explanations relating to the motor vehicle according to the present disclosure can be analogously transferred to the method in accordance with the present disclosure in such a manner that the advantages already mentioned can also be achieved with this method.

As already explained, the term "environment object" is to be understood in a broad and abstract manner, in particular also as a designated surrounding area, but the environment object can also be a physically present environment object. An environment direction can also preferably be a direction defined by a straight line, especially in the horizontal, but broader or more generally defined directions such as "away from the motor vehicle" or "towards the motor vehicle" are also conceivable.

Specifically, it can be provided that control information describing a spatial and/or temporal illumination pattern is determined for control in accordance with the illumination information. Such control information can describe, for example, which illumination segment of the illumination region is to be operated in what manner, in particular whether it is to be illuminated or not and/or with which light intensity and/or which light color is to be illuminated. In this case, temporally dynamic profiles of the respective illumination parameters of an illumination pattern are also conceivable, for example light intensity profiles, light color profiles and/or defined time periods in which an illumination segment is to be illuminated or is not to be illuminated, after it has been shown that such a temporally dynamic illumination of the surroundings of the motor vehicle can be used to provide information and assistance in a particularly sustainable manner and in a memorable and intuitive manner. It is therefore particularly advantageous in this context if the illumination pattern comprises spatially and/or temporally varying light intensities and/or light colors.

In advantageous developments, the illumination pattern can be retrieved at least partially from a database of pre-defined illumination patterns, in particular as a function of the illumination information. Therefore, the illumination patterns assigned to certain illumination information, which can optionally be further parameterizable at least in part, in particular on the basis of the illumination information itself, can already be present in a database in a pre-stored manner and, in the case of the presence of a corresponding illumination information, be retrieved therefrom in order to determine the control information based on this. In this manner, the illumination patterns do not necessarily have to be newly determined, in particular completely, from the illumination information, but can, at least in part, already be pre-calculated and predefined.

In a particularly expedient development of the present disclosure, it can be provided that the illumination pattern is determined based at least in part on a personalization information provided by a user. This means that the user, for example a driver of the motor vehicle, can be provided with the possibility of personalizing light functions, for example by providing certain patterns, colors, light intensities and the like for certain circumstances, for example light functions and/or illumination information. This is particularly useful with regard to light functions such as a "coming home" function and/or a "leaving home" function, in which, when approaching the motor vehicle and/or moving away from the motor vehicle, an assisting light support is to be provided, which can then be selected to be personalized, so to speak.

For illuminating and/or highlighting the at least one environment object, it can be provided that illumination segments containing the latter are illuminated more brightly and/or in another light color as an object environment of the environment object. Of course, other approaches are also conceivable here, for example in such a manner that, when the other illumination segments are currently not operated anyway, only the illumination segments containing the environment object and/or surrounding the environment object are operated at all. A highlighting of an environment object can in principle also be conceivable to the effect that exactly the illumination segments containing the object are not illuminated.

For displaying the at least one environment direction, it can be provided that illumination segments following one another in the environment direction are illuminated differently from one another and/or in a temporally dynamic sequence and/or by illumination segments adjacent in the circumferential direction and/or spacing direction. For example, segments following one another in the environment direction can be found on the basis of the illumination information and operated differently from surrounding illumination segments or in a manner that varies over time, in particular with respect to one another. In this manner, a particularly intuitive communication of directions to an occupant of the motor vehicle, for example a driver, and/or a person located in the vicinity of the motor vehicle is created.

In concrete embodiments of the present disclosure, it can be provided, for example, that a puddle and/or a cyclist, wherein, in particular, a distance recommendation is additionally displayed as additional information, and/or a danger zone and/or a pedestrian and/or a charging device for an energy storage device and/or tank of the motor vehicle and/or a clearance zone characterizing a lateral distance to be kept clear and/or a dark zone illuminated by a road light below a brightness threshold value and/or a surrounding area located between the host motor vehicle and a motor vehicle immediately ahead and/or following, in particular during a subsequent journey, and/or an obstacle and/or a surrounding area located between the obstacle and the motor vehicle, in particular during a parking and/or maneuvering procedure, are used as the environment object.

In a specific example, in an approach light function, which can be used, for example, in a maneuvering and/or parking process, the area between an obstacle and the motor vehicle can be illuminated more strongly by illumination segments of the illumination device in order to assist the driver here. In this context, a general parking or maneuvering light function is also conceivable, which overall highlights and/or illuminates the obstacles themselves as environment objects. Of course, this applies analogously to other hazard locations and/or other road users.

In another example, a distance light function is also conceivable, by means of which a distance recommendation to another road user, in particular a two-wheeler driver such as a cyclist and/or a motor scooter, can be displayed. In such an embodiment, for example during an overtaking maneuver of a two-wheeler driver, not only is the two-wheeler driver himself illuminated or highlighted in order to be easily recognizable by the driver of the motor vehicle, but additional information can also be output by means of the illumination device indicating what the recommended distance to the two-wheeler driver is, for example as a distance range highlighted in a different light color and/or by means of a symbolism with sufficiently high spatial resolution by the illumination segments. With particular advantage, the distance recommendation can be visualized by means of the illumination device around the position of two-wheelers driving ahead, in particular bicycles and/or motor scooters, in order to enable safe overtaking, which is particularly expedient in urban areas and/or on country roads. This can also serve to highlight the corresponding environment object at the same time, since the distance recommendation at least partially encloses it. In another embodiment of such a distance recommendation function, it can also be provided that, as already indicated, a minimum distance is illustrated during the overtaking operation via the illumination device, for example as an illumination region projecting in the direction of the two-wheeler driver, in order to protect the vehicle's occupants and the two-wheeler driver from risks.

In a further example, a subsequent trip light function is also conceivable by means of the illumination device. For example, during a subsequent trip it may be appropriate to reduce the range of conventional illumination, for example by headlights, and/or even to switch it off completely, and to add or switch on illumination by the illumination device. In this manner, improved sensitization to one's own position with simultaneous energy saving can be achieved.

Another example of a light function can also be referred to as a "hazard spot". If a potential hazard, such as an obstacle that cannot be driven over, is detected, in particular on the basis of the sensor data, the corresponding environment object is highlighted at its position so that the driver is immediately aware of it.

Furthermore, a configuration of the light function as puddle light is also conceivable. For example, in order to make puddles in the immediate vicinity of the motor vehicle more easily recognizable by occupants when exiting, these can be highlighted by illumination segments of the periphery lighting comprising the puddle as an environment object. This can be seen as an extension or possibly even as a replacement for a door light.

In a particularly advantageous example, the motor vehicle can also be used to support or supplement the street lighting. For this purpose, it can be provided that dark areas in the illumination region that are not sufficiently illuminated by the street lighting are detected as environment objects and the illumination device is controlled accordingly in order to additionally illuminate these areas. The motor vehicle can therefore function as part of the street lighting system, for example when parked or standing still, but also in urban traffic, and the illumination device additionally illuminates the surrounding area of the vehicle that are too dark, i.e. dark areas. If this support function is active, it also designates the host motor vehicle in the parked state as a potential obstacle (parking light/obstacle lighting).

Surrounding areas moving with the motor vehicle can also be defined as environment objects, for example those indicating a desired lateral distance from the host motor vehicle. This is useful information not only for the driver of the host motor vehicle, but also for other road users who can orientate themselves by the illumination of such a surrounding area, in particular choosing not to drive into it.

However, objects that need to be found can also be highlighted by means of the illumination device, for example charging stations, gasoline pumps or other recharging facilities, in order to make them more recognizable and thus usable for the driver.

With regard to the environment direction, an advantageous embodiment provides that an approach direction of a dynamic environment object and/or a current driving direction of the host motor vehicle and/or a driving direction indicator direction to be displayed in addition to a driving direction indicator on the motor vehicle and described by a driving direction indicator signal and/or a target movement direction supplied in particular by a navigation system and/or a driver assistance system and/or a direction to an environment object located outside the illumination region is used as the environment direction.

For better assessment of the traffic situation by the driver, it is therefore conceivable, for example, to reproduce driving directions of other road users and/or of the host motor vehicle as environment directions. In particular, environment directions can also relate to environment objects lying outside the illumination region of the illumination device, for example obstacles and/or other road users, to indicate their presence and at the same time to output an indication of their position.

It is also particularly useful to display target directions in the context of at least one light function, for example in a navigation light function. These do not necessarily have to be target movement directions of the motor vehicle in order to reach a navigation destination, but it can also be displayed particularly advantageously in which direction a navigation destination which is not entirely reachable by the motor vehicle lies, so that the driver can select the correct direction as a pedestrian when setting off from the motor vehicle.

In a particularly advantageous embodiment, a particularly advantageously animated addition of a direction indicator (turn signal) installed on the motor vehicle can also be provided by a direction indicator light function. For example, starting from the position of the direction indicator as a further lighting device of the motor vehicle, after its flashing the flashing process can be continued, as it were, via the illumination segments following in the corresponding direction, which do indeed follow one another in the spacing direction, in order to significantly improve the perceptibility of the direction indication process and thus also to increase the safety of the host motor vehicle. Of course, other embodiments are also conceivable in which, for example, the entire side area next to the motor vehicle also flashes in the direction in which the direction indicator flashes or a direction indicator animation is reproduced on this side of the motor vehicle.

With regard to the additional information, a particularly preferred embodiment provides that it comprises a parameter which is displayed via an extent of an illuminated interval in the spacing direction and/or a speed of a dynamic of the illumination and/or via a light color and/or a light color profile in the spacing direction. For example, it is conceivable to activate a certain number of illumination segments in the spacing direction or to illuminate them in a certain light color and/or light intensity depending on the value of the parameter. It is also conceivable to reproduce a numerical value by a speed of a dynamic of the illumination, in particular related to the distance, according to which, for example, a faster running light or similar can be used with increasing value, in particular outwards away from the motor vehicle or towards the motor vehicle by the distance segmentation. Color scales can of course also be used to represent the value of a parameter.

Furthermore, it is conceivable with respect to the additional information that the additional information comprises an image information that is to be projected onto the ground of the surroundings and resolved in accordance with the preferably matrix-like segmentation. In particular, if a high resolution is selected, for example if illumination segments with a maximum extension of less than 50 cm, preferably less than 20 cm, are realized, image information, for example symbols, letters/texts, numbers, arrows, pictograms and similar, can also be output as additional information by means of the illumination device and its segments, ultimately at any points around the motor vehicle, wherein a plurality of such image information can also be output simultaneously on different sides of the motor vehicle.

In a specific embodiment, the additional information can comprise warning information, in particular relating to an attempted theft and/or a detected pedestrian and/or an imminent departure of the motor vehicle, and/or reminder information relating to an action to be performed on the motor vehicle and/or charging information relating to a charging process and/or refueling process, in particular charging information comprising a state of charge and/or filling state as a parameter and/or charging information indicating a start of charging and/or completion of charging, and/or emergency information, in particular an extended hazard warning light and/or a panic light, and/or a future planned and/or recommended trajectory of the motor vehicle, in particular for implementing a lane merge assistant or lane change assistant.

By means of the illumination device and its operation according to the present disclosure, a theft warning and/or an indication of danger can thus be realized, for example, in such a manner that, for example, in addition to an acoustic theft warning, as it is known, an optical, visual theft warning can also take place in the illumination region, which can, in a particularly advantageous manner, additionally make actions of a still active thief particularly easily recognizable. In this context, the periphery lighting implemented according to the present disclosure can also be used to signal the direction of detected pedestrians, for example in automated driving mode using a vehicle system designed for fully automatic guidance of the motor vehicle, which can be done, for example, by the angle-dependent switching on, dimming and/or color change of illumination segments in order to convey to the pedestrian that the motor vehicle, in particular fully automatically guided, has detected the pedestrian. A restart of movement of the motor vehicle can also be signaled to other road users in this manner, for example by pulsing twice in the entire illumination region.

Another example is a reminder light function in which an indication of an action to be carried out on the motor vehicle can ultimately take place by way of the type and in particular also localization of an illumination pattern, for example a window of the motor vehicle that is still to be closed, an object remaining in the motor vehicle and the like.

A particularly advantageous embodiment results when using charge information related to a charging process and/or a refueling process. In this case, a charging process relates in particular to a motor vehicle equipped with an electric motor with an associated high-voltage battery which can be charged externally. Such a charging and/or similar tank function related to a fuel can thereby output various additional information and also relate to environment directions and/or environment objects, for example, as already mentioned, the illumination of a environment direction to a charging device, in particular a charging station, and/or a gasoline pump or their illumination/highlighting. In particular, when the motor vehicle is located at a charging device or gasoline pump, a surrounding illumination can thus be realized via the illumination device in order to illuminate dark surroundings suitable for a charging and/or refueling process. Particularly advantageously, however, the start, the progress and the conclusion of a charging process can be visualized by dimming, color change and/or additional connection of illumination segments. For example, a state of charge of a high-voltage battery of the motor vehicle can be contained as a parameter in the additional information, in such a manner that, for example, the charging progress can be displayed in the manner of a bar graph in the entire surroundings of the motor vehicle, in particular over the entire circumference of the motor vehicle, for example by virtue of the fact that, as is known from other charging processes in other devices, only at least one illumination segment is illuminated close to the motor vehicle in the event of a low charging state and adjacent illumination segments which are further spaced apart toward the outside are added with increasing charge state, wherein the beginning or the end of the charging process can be signaled, for example, by flashing of this charging status indicator. Of course, embodiments are also conceivable in which a corresponding representation is implemented via light colors or a light color profile and/or different brightnesses (light intensities). In this manner, a complete support and information output during a charging process or also a refueling process is provided.

In another example, the illumination device can also be used to implement emergency information, in particular an expanded flashing warning light and/or a panic light. Such emergency information can, for example, represent an active emergency call of a motor vehicle emergency call system, but also generally display an active hazard warning or an active panic mode. In particular, a sensitization, in particular of other road users, to the respective situation can be achieved by an intensity variation and/or a color change of the surrounding light in the illumination region.

Further additional information that can advantageously be output in particular in a matrix-like segmented area relates to a planned and/or recommended trajectory of the motor vehicle. This is also useful in particular in the context of a maneuvering light function, according to which, for example, the trajectory can be visualized during maneuvering operations by active illumination segments. With regard to the maneuvering light, it should also be noted that a general support can also take place, for example an activation of rear illumination segments of the illumination device during a reversing operation and/or a realization of an illumination with a focus counter to the steering direction in the front region of the motor vehicle, which facilitates the obstacle perception during reversing operations (inverse cornering light) and/or similar.

Particularly advantageously, a lane change assistant can also use the illumination device in order to be able to better reproduce a recommended lane change trajectory, for example. A lane merge assistant is also particularly useful, in which at the end of lanes other road users can be prompted to merge (merge in front of the host motor vehicle), for example by displaying animated illumination segments on the side and/or front of the vehicle in the direction of travel. A right-of-way signaling light function can also be implemented within the scope of the present disclosure, for example, by providing a granted right-of-way in a similar animation on the front of the vehicle (allowing traffic to pass).

The illumination device can particularly advantageously be used, in particular additionally, also for realizing further, basically already known functionalities, and thus light functions. For example, the illumination device can be operated additionally to implement an orientation light function, in particular after arrival or before departure and/or to illuminate a door area, and/or a maneuvering light function, as already described, in particular a reversing light and/or a cornering light to be used in particular when the motor vehicle is reversing. Orientation light functions, in particular so-called "coming home" or "leaving home" functions, can be implemented with improved staging using the illumination device according to the present disclosure. For example, a user can personalize animations and/or general illumination patterns of such an orientation light function via personalization information, which can then be stored in an individual user profile and can be retrieved again. Of course, the storage, in particular the user profile, can also take place in the already mentioned database.

In an advantageous further development of the method according to the present disclosure, it can further be provided that the light intensity of the illuminated illumination segments is selected as a function of an input information describing the ambient brightness. In other words, in accordance with the present disclosure, the illumination device can be provided with an adaptive, environmental-sensitive intensity variation, wherein, in particular, when the ambient brightness falls below a parameterizable threshold, a dimming of the periphery lighting to a lower level, i.e., a low light intensity, can take place in particular while taking into account further boundary conditions. Such active dimming favors the perception in darker environments and avoids glare. For example, at least one look-up table can be provided, in which a degree of dimming is assigned to certain values of the ambient brightness, in particular below the parameterizable threshold. If the boundary conditions of the active dimming are no longer given, in particular the ambient brightness rises above the parameterizable threshold, the light intensity is increased to the higher level.

Further advantages and details of the present disclosure arise from the exemplary embodiments described below and in reference to the drawings.

Figure 2:
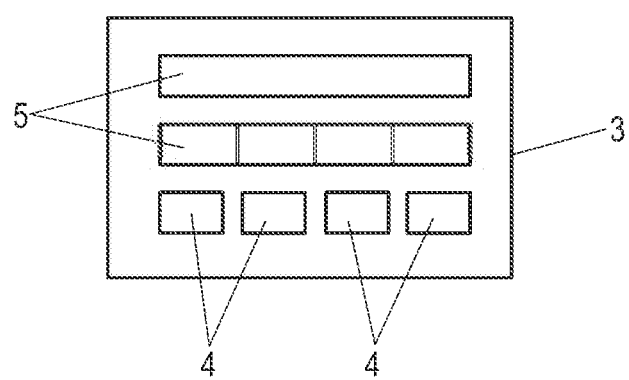
FIG. 2 illustrates a schematic diagram of an illumination module.

FIG. 1 illustrates a schematic diagram of a motor vehicle 1 according to the present disclosure. The motor vehicle 1 has an illumination device 2, in the present case additionally to further illumination devices such as headlights, rear lights, direction indicators, reversing lights, brake lights, license plate illuminations and similar. The illumination device has illumination modules 3 which are installed, specifically integrated, close to the ground on the outer circumference of the motor vehicle and which, as shown schematically in FIG. 2, can comprise at least one light source 4 and optionally at least one optical component 5. The light sources 4 can be, for example, light-emitting diodes or light-emitting diode arrangements, for example a light-emitting diode arrangement which comprises at least one red, one green and one blue light-emitting diode and is thus capable of emitting differently colored light with appropriate control. Optical components may be lenses, apertures, filters, and similar. In particular, it is conceivable that an illumination module has at least one light source 4 and optionally at least one optical component 5 in order to form a projection device which allows at least one substantially sharply delimited light surface in the surroundings of the motor vehicle 1 to be illuminated, which can form an illumination segment, as will be explained in more detail below. Furthermore, an activation for different light intensities can take place, for example by pulse width modulation.

Returning to FIG. 1, the illumination modules 3, i.e. the light sources 4 and the optional optical components 5, are installed close to the ground in that the illumination modules 3 are installed in the two side sills 6, the front apron 7 and the rear apron 8. In addition, illumination modules can also be installed in bumpers and/or the underbody of the motor vehicle 1.

The operation of the illumination modules 3 is controlled by a control device 8 of the illumination device 2, via which various light functions of a vehicle system 9, to which the control device 8 belongs, can be implemented. To obtain suitable input information for the light functions, the control device 8 is connected to environment sensors 10 of the motor vehicle 1 and further vehicle systems 11, for example via a bus system of the motor vehicle 1. The motor vehicle 1 also has an input device 12 by means of which personalization information regarding the illumination device 2 or the light functions can be received from a user.

For the implementation of various light functions, the control device 8 has an evaluation unit 13 in which a piece of illumination information can be determined, which contains information regarding the desired illumination result. This illumination information is converted in a control unit 14 into control signals for the illumination modules 3, i.e. the light sources 4 and optionally the optical components 5, wherein the control can take place via at least one bus system of the motor vehicle, for example a LIN bus and/or a CAN bus.

Figure 3:
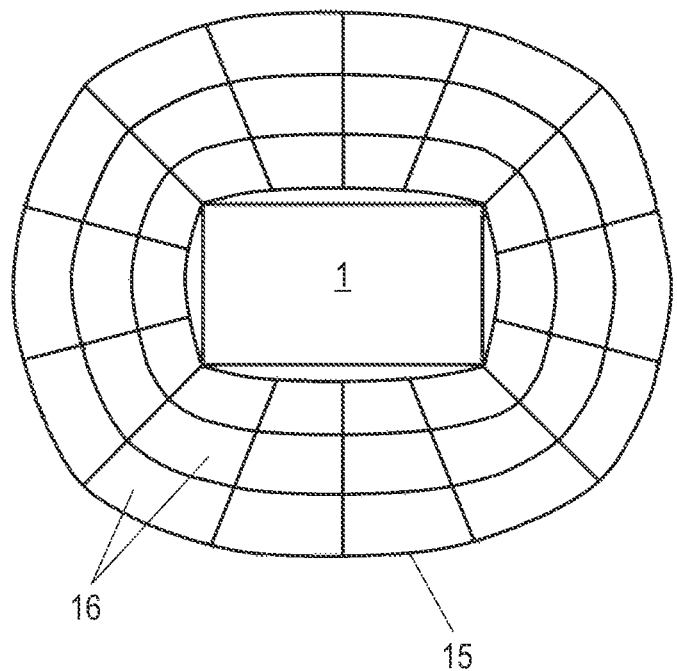
FIG. 3 illustrates the motor vehicle with an illumination region surrounding it.

Due to the arrangement and configuration of the illumination modules 3 as well as their activation options, the illumination device 2, as shown in FIG. 3, has a simultaneously illuminable illumination region 15 that covers the entire surroundings of the motor vehicle 1 in the circumferential direction and is divided into independently controllable illumination segments 16, which are indicated here at least schematically, which follow one another both in the peripheral direction and in the spacing direction from the motor vehicle 1. Overall, it can be said that the maximum possible illumination region 15 is divided in a matrix-like manner into the illumination segments 16, wherein in FIG. 3, a relatively rough resolution with large illumination segments 16 is shown for better illustration, but of course a finer resolution in the circumferential direction and/or spacing direction is also possible, for example up to the centimeter range, in particular with edge lengths of less than 20 cm. While the illumination segments 16 may partially overlap, a design of the illumination device 2 to define the illumination segments 16 as sharply as possible is preferred.

In the present exemplary embodiment, the illumination region at each position along the circumference extends from a starting value which can be from 0 to 0.2 m, up to a final value which can be 2.5 to 3.5 m, in particular up to 3 m, starting from the motor vehicle 1. This means that the illumination device 2 relates, in particular, to the close range around the motor vehicle 1, in particular as close as possible to this or possibly even starting below the motor vehicle 1. Accordingly, other exemplary embodiments are also conceivable in which the illumination region 15 basically starts at least directly at the motor vehicle 1.

The segmentation both in the peripheral direction and in the spacing direction can advantageously be used by different light functions in different manners. In particular, environment objects described by the illumination information can be illuminated and/or highlighted, environment directions can be displayed and/or additional information, in particular communication information, can be displayed.

Figure 4:
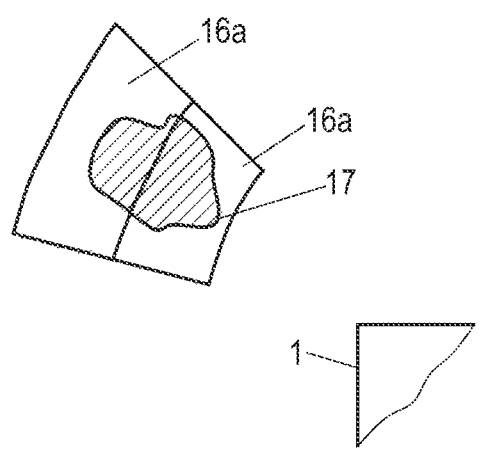
FIG. 4 illustrates a first illumination situation by way of example.

FIG. 4 illustrates a possibility for highlighting an environment object 17. Obviously, those illumination segments 16a are illuminated there or distinguishably illuminated from surrounding illumination segments 16 in such a manner that the environment object 17 is illuminated or highlighted accordingly. Here, it should be noted at this point that the configuration of the illumination device 2 is generally such that different light intensities (brightnesses) and different light colors can be selected for the illumination segments 16, wherein the light intensities can also be achieved in particular in the form of a continuously variable dimmability, for example by a pulse width modulation method.

Other variants for highlighting an environment object 17 are also conceivable, for example by means of distinguishable illumination of illumination segments 16 surrounding the environment object 17 or similar.

In addition, the concept of an environment object is to be understood broadly here, according to the fact that also, for example, distinguished surrounding areas, for example clearly defined surfaces in the horizontal, can form environment objects, in addition to objective environment objects. Environment objects can be detected in particular by evaluating sensor data of the at least one environment sensor 10, which can accordingly serve as input information.

Figure 5:
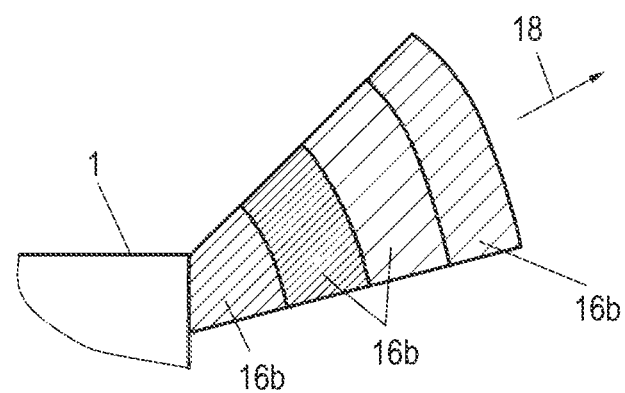
FIG. 5 illustrates a second illumination situation by way of example.

FIG. 5 illustrates a possibility for displaying an environment direction 18. In this case, illumination segments 16b lying in the environment direction 18 are not only controlled differently to adjacent illumination segments 16, but also different from one another in order to make the highlighting particularly intuitive. Specifically, in the environment direction 18 successive illumination segments 16b are illuminated both with one another and in a temporally dynamic sequence. For example, a brighter illuminated illumination segment 16b may pass through the sequence of illumination segments 16b starting from the motor vehicle 1 to indicate the environment direction 18, in particular as away from the motor vehicle.

Figure 6:
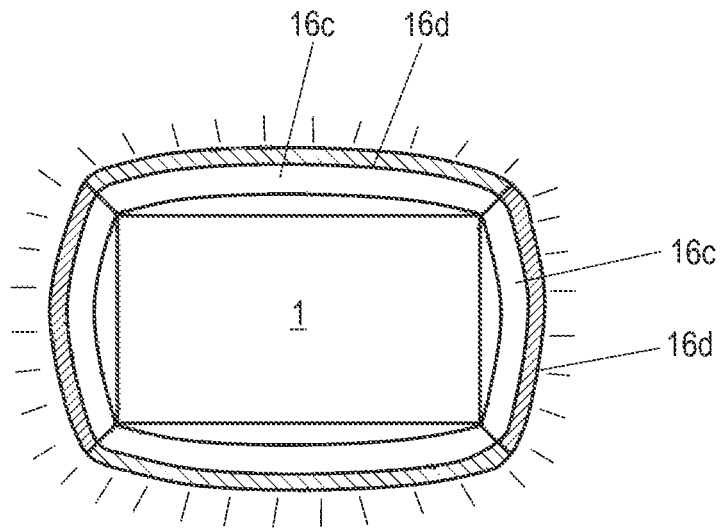
FIG. 6 illustrates a third illumination situation by way of example.

In the illumination situation of FIG. 6, additional information, in the present case a parameter, is to be displayed. For this purpose, illumination segments 16c, 16d corresponding to the value of the parameter are illuminated starting from the motor vehicle 1 in the spacing direction, wherein in particular in the case of a parameter changing over time, the respective outermost illumination segments 16d, which ultimately correspond to the range of values currently held by the value of the parameter, can be reproduced flashing in order to reflect this change over time. A preferred example, which will be explained in more detail below, is the state of charge of a high-voltage battery of the motor vehicle 1 during a charging process. The permanently or evenly illuminated inner segments 16c indicate the already completed charging activity, while the flashing segment 16d indicates the still current charging process and reflects in which state of charge range the charging activity is currently taking place. Of course, other possibilities are also conceivable to display a parameter as additional information in general, in addition to the extension of an illuminated interval in the spacing direction shown here. For example, it is conceivable to use a speed of the temporal dynamics of the illumination, a light color, a light color profile or the like, in order to reproduce the parameter using the segmentation.

Figure 7:
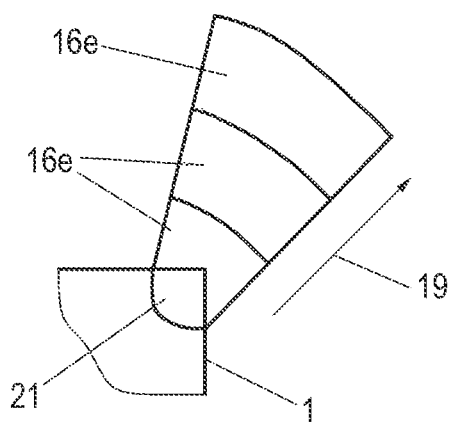
FIG. 7 illustrates a fourth illumination situation by way of example.

FIG. 7 illustrates a possible use of the illumination device 2 for a dynamic driving direction display function. It is assumed there that the motor vehicle has at least one direction indicator 21 (turn signal) as a further lighting device. The flashing of this turn signal can be continued, so to speak, in the direction of flashing 19 by means of the illumination segments 16e following one another in the spacing direction, while after the illumination of the direction indicator 21 the illumination segments 16e follow continuously from the motor vehicle 1, which more clearly recognizable and intuitively reflects the intention of the driver of the motor vehicle 1.

Figure 8:
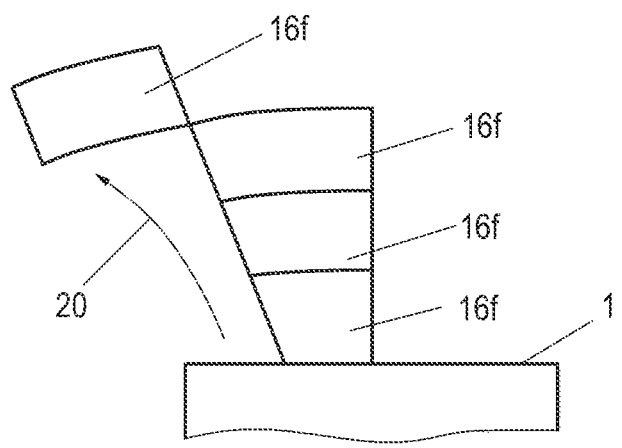
FIG. 8 illustrates a fifth illumination situation by way of example.

Finally, FIG. 8 illustrates a possible use of the illumination device 2 in a lane change assistant or a lane merge assistant. In this case, the illumination segments 16f show, by virtue of their illumination or highlighted illumination, other road users in a temporal dynamic or spatial view that the motor vehicle 1 now intends to change lanes in accordance with the arrow 20. In particular in combination with further additional information, in particular symbols, the traffic can thus be organized around the motor vehicle 1, for example in order to achieve a lane merging method of one car merging after the other in a lane merging process.

In the context of the embodiment shown here, a plurality of further light functions are also possible, which are to be mentioned in the following at least briefly. For example, an approach light function can be realized, wherein whenever the motor vehicle approaches an obstacle during a parking process, the region leading to the obstacle can be illuminated as an environment object by illumination segments 16 of the periphery lighting with a higher intensity. The obstacle itself can of course also be highlighted as described. If the obstacle lies outside the illumination region 15, the environment direction to this obstacle can be illuminated.

An emergency information can also be output via the illumination device 2 or a warning information relating to a theft attempt can be output. Thus, in the case of an active theft warning, an active emergency call of an internal emergency call system of the motor vehicle 1 or an active panic mode, this can be communicated to other road users by means of a light intensity variation and/or light color variation in particularly all illumination segments 16.

In a further preferred light function, a distance recommendation for two-wheeled vehicles, in particular cyclists and/or motor scooters, or a respective overtaking warning can be realized. In urban areas and on country roads, a distance recommendation can be implemented around the position of two-wheelers or motor scooters driving ahead by illuminating the illumination segments 16 surrounding the corresponding environment object accordingly, for example in a highlighting manner or in a principally operated manner. The number of illuminated illumination segments then ultimately gives a distance recommendation that is visualized. A hazard-free overtaking can thus be made possible. In another embodiment, a minimum distance can also be displayed to the overtaking person via the illumination device 2 in order to protect the vehicle occupants as well as the person being overtaken from risks.

A further conceivable light function relates to secondary hazards in which the range of the conventional illumination, for example by headlights, is reduced and the periphery lighting of the illumination device 2 can be switched on in addition. This serves for sensitization to one's own position while saving energy at the same time.

Generally speaking, for example in a "hazard spot" light function, potential hazards can be highlighted and made better recognizable by illumination, for example obstacles that can not be driven over as environment objects.

As additional information, in light functions useful in particular for fully automatic operation of the motor vehicle in a vehicle system 11 designed for fully automatic guidance of the motor vehicle, environment direction 18 in the direction of detected pedestrians, for example, can be displayed or highlighted to convey to the pedestrians that they have been detected. A restart of movement of the motor vehicle 1 can be indicated, for example, by pulsing twice in the entire illumination region 15.

Particularly advantageous embodiment results with an assisted light function for a refueling process or, particularly advantageously, for a charging process in which a high-voltage battery of the motor vehicle 1, from which an electric motor of the motor vehicle 1 is fed, is charged, which usually takes up a somewhat longer period of time. The illumination device 2 now makes it possible not only to adequately illuminate the corresponding charging device, for example a charging station, but rather to also realize a start-of-charge display, a state of charge display and a charging termination display, as has already been partly described with respect to FIG. 6. The start, the progress and the completion of a charging process can accordingly be visualized by light intensity variations, light color changes and/or additional switching-on of illumination segments 16.

A further advantageous light function is provided by a "puddle light". In this manner, it can be made possible to detect puddles in the immediate vicinity of the motor vehicle 1 when exiting, in that they are highlighted by individual illumination segments 16 of the illumination device 2.

In addition to the example already described with respect to FIG. 8, it can also be expedient in other cases to display the future driving trajectory of the motor vehicle 1 as additional information by means of the illumination segments 16, for example in the case of maneuvering operations.

The illumination device 2 can also be used particularly advantageously to support street lighting. For example, dark points can be located as the environment object 17, which can be illuminated in a targeted manner for supplementing the street lighting. In principle, support of street lighting by complete operation in the entire illumination region 15 is also possible. In both variants, the host motor vehicle functions in the parked state or in urban traffic as additional street lighting and correspondingly illuminates regions close to the vehicle. The active function also flags the host motor vehicle in the parked state as a potential obstacle.

Expediently, the control device 8 is also configured to implement an adaptive environmental-sensitive intensity variation with respect to the illumination device 2. Specifically, when the ambient brightness, for example measured by a corresponding ambient brightness sensor, falls below a parameterizable threshold, dimming of the periphery lighting by the illumination device 2 can take place, since it is easier to recognize in the dark. Further boundary conditions can also be taken into account. As soon as the ambient brightness rises again over the parameterizable threshold, the active dimming is ended.

As has already been explained, the use of personalization information allows an individualization of at least a part of the light functions which are provided by the vehicle system 9 or the control device 8. This is particularly expedient for assisting functions, which also have a staging character. For example, a "coming home"/"leaving home" function can also be provided, for which the user can define and store his or her own illumination patterns by means of the input device 12, if necessary also of a temporally dynamic nature. Of course, this can also be made possible for other light functions, for example the charging light function.

The illumination device 2 can also be used particularly advantageously in maneuvering processes and similar. There, it is possible, for example, to activate the rear illumination segments 16 when reversing, while in the front area of the motor vehicle the illumination is provided by the illumination device 2 with a focus opposite to the steering direction, in such a manner that obstacles can be better perceived when reversing.

For the specific control of the illumination modules 3, the illumination information of the evaluation unit 13 in the control unit 14 can be used to determine a control information describing an illumination pattern. The illumination pattern can describe in particular spatial and/or temporal differences of the illumination of different illumination segments 16. Since predefined illumination patterns can be provided for some lighting functions, which can be further parameterized if necessary as a function of the illumination information, it is expedient to provide a database of predefined illumination patterns through corresponding control information within the motor vehicle 1, in particular in the control device 8, which can be retrieved as a function of the illumination information.

The invention claimed is:

1. A motor vehicle comprising:
   an illumination device, wherein the illumination device comprises a plurality of light sources for illuminating an illumination region, the light sources being able to be simultaneously illuminated; and
   a control device,
   wherein the illumination region completely covers surroundings of the motor vehicle in a circumferential direction,
   wherein the illumination region includes at least two illumination segments, the at least two illumination segments following one another in a spacing direction from the motor vehicle, and the at least two illumination segments being controllable independently by the control device for illumination as part of at least one light function,
   wherein the illumination region is divided in a matrix-like manner by the at least two illumination segments in the circumferential direction and the spacing direction, and
   wherein each illumination segment covers a predefined circumferential and spacing region, and
   wherein the control device is configured to:
      evaluate input information of the at least one light function, wherein the input information comprises sensor data of at least one environment sensor of the motor vehicle;
      determine illumination information, wherein the illumination information describes at least one of an environment object to be illuminated, an environment object to be highlighted, an environment direction to be indicated, or an additional information to be indicated by illuminated intervals of the illumination region in a distance direction; and
      control the illumination device in accordance with the illumination information, wherein controlling the illumination device includes at least one of illuminating the environment object, highlighting the environment object, displaying the environment direction, or displaying the additional information, and
   wherein the control device is further configured to control the illumination device by:
      implementing an orientation light function, the orientation light function being used after arrival or before departure, and/or illuminating a door region; or
      providing a maneuvering light function, the maneuvering light function being used as a reversing light and/or a cornering light when the motor vehicle is reversing.

2. The motor vehicle according to claim 1, wherein the illumination region comprises a distance from the motor vehicle, the distance starting at 0 to 0.2 m and/or ending at 2.5 to 3.5 m in the spacing direction.

3. The motor vehicle according to claim 1,
   wherein the light sources comprise at least one of an LED, a laser light source, or a projector;
   wherein the light sources are at least partially installed in at least one of a sill, a front apron, a rear apron, an underbody, a bumper, a wheel arch, a spoiler, a radiator grill, an exterior mirror, a door, or a tailgate; or
   wherein the illumination device is configured to illuminate at least a portion of the at least two illumination segments in at least one of different light intensities or light colors.

4. The motor vehicle according to claim 1,
   wherein the at least one light function includes at least one of distance-related illumination of an environment object or highlighting of an environment object,
   wherein the at least one light function includes dynamic display of an environment direction that is directed away from the motor vehicle or towards the motor vehicle, the control device supporting the at least one light function by being configured to provide different control of at least two illumination segments offset from one another in the spacing direction, or
   wherein the at least one light function includes display of an additional information by illuminated intervals of the illumination region in the spacing direction.

5. A method for operating an illumination device of a motor vehicle, wherein the motor vehicle comprises:
   the illumination device, wherein the illumination device comprises a plurality of light sources for illuminating an illumination region, the light sources being able to be simultaneously illuminated; and
   a control device,
      wherein the illumination region completely covers surroundings of the motor vehicle in a circumferential direction,
      wherein the illumination region includes at least two illumination segments, the at least two illumination segments following one another in a spacing direction from the motor vehicle, and the at least two illumination segments being controllable independently by the control device for illumination as part of at least one light function,
      wherein the illumination region is divided in a matrix-like manner by the illumination segments in the circumferential direction and the spacing direction, and
      wherein each illumination segment covers a predefined circumferential and spacing region, the method comprising:
         evaluating input information of the at least one light function, wherein the input information comprises sensor data of at least one environment sensor of the motor vehicle;
         determining illumination information, wherein the illumination information describes at least one of an environment object to be illuminated, an environment object to be highlighted, an environment direction to be indicated, or an additional information to be indicated by illuminated intervals of the illumination region in a distance direction; and
controlling the illumination device in accordance with the illumination information, wherein controlling the illumination device includes at least one of illuminating the environment object, highlighting the environment object, displaying the environment direction, or displaying the additional information, wherein the controlling the illumination device further comprises:
implementing an orientation light function, the orientation light function being used after arrival or before departure, and/or illuminating a door region; or
providing a maneuvering light function, the maneuvering light function being used as a reversing light and/or a cornering light when the motor vehicle is reversing.

6. A method for operating an illumination device of a motor vehicle, wherein the motor vehicle comprises:
the illumination device, wherein the illumination device comprises a plurality of light sources for illuminating an illumination region, the light sources being able to be simultaneously illuminated; and
a control device,
wherein the illumination region completely covers surroundings of the motor vehicle in a circumferential direction,
wherein the illumination region includes at least two illumination segments, the at least two illumination segments following one another in a spacing direction from the motor vehicle, and the at least two illumination segments being controllable independently by the control device for illumination as part of at least one light function,
wherein the illumination region is divided in a matrix-like manner by the at least two illumination segments in the circumferential direction and the spacing direction, and
wherein each illumination segment covers a predefined circumferential and spacing region,
the method comprising:
evaluating input information of the at least one light function, wherein the input information comprises sensor data of at least one environment sensor of the motor vehicle;
determining illumination information, wherein the illumination information describes at least one of an environment object to be illuminated, an environment object to be highlighted, an environment direction to be indicated, or an additional information to be indicated by illuminated intervals of the illumination region in a distance direction; and
controlling the illumination device in accordance with the illumination information, wherein controlling the illumination device includes at least one of illuminating the environment object, highlighting the environment object, displaying the environment direction, or displaying the additional information; and
determining control information in accordance with the illumination information, wherein the control information describes at least one of a spatial illumination pattern or a temporal illumination pattern,
wherein the spatial or temporal illumination pattern comprises at least one of spatially varying light intensities, temporally varying light intensities, spatially varying light colors, or temporally varying light colors, or
wherein the spatial or temporal illumination pattern is retrieved at least partially from a database of predefined illumination patterns; or
wherein the spatial or temporal illumination pattern is determined at least partially based on a personalization information provided by a user.

7. A method for operating an illumination device of a motor vehicle, wherein the motor vehicle comprises:
the illumination device, wherein the illumination device comprises a plurality of light sources for illuminating an illumination region, the light sources being able to be simultaneously illuminated; and
a control device,
wherein the illumination region completely covers surroundings of the motor vehicle in a circumferential direction,
wherein the illumination region includes at least two illumination segments, the at least two illumination segments following one another in a spacing direction from the motor vehicle, and the at least two illumination segments being controllable independently by the control device for illumination as part of at least one light function,
wherein the illumination region is divided in a matrix-like manner by the at least two illumination segments in the circumferential direction and the spacing direction, and
wherein each illumination segment covers a predefined circumferential and spacing region,
the method comprising:
evaluating input information of the at least one light function, wherein the input information comprises sensor data of at least one environment sensor of the motor vehicle;
determining illumination information, wherein the illumination information describes at least one of an environment object to be illuminated, an environment object to be highlighted, an environment direction to be indicated, or an additional information to be indicated by illuminated intervals of the illumination region in a distance direction; and
controlling the illumination device in accordance with the illumination information, wherein controlling the illumination device includes at least one of illuminating the environment object, highlighting the environment object, displaying the environment direction, or displaying the additional information,
wherein illuminating the environment object and/or highlighting the environment object comprises at least one of:
illuminating illumination segments covering the environment object brighter;
illuminating illumination segments covering the environment object in a different light color than surroundings of the environment object; or
displaying the environment direction comprising at least one of:
illuminating illumination segments that follow one another in the environment direction differently from one another,
illuminating illumination segments that follow one another in the environment direction in a temporally dynamic sequence, or
illuminating illumination segments that follow one another in the environment direction differently from illumination segments that are adjacent to respective illumination segments in the circumferential direction and/or the spacing direction.

8. A method for operating an illumination device of a motor vehicle, wherein the motor vehicle comprises:
the illumination device, wherein the illumination device comprises a plurality of light sources for illuminating an illumination region, the light sources being able to be simultaneously illuminated; and
a control device,
wherein the illumination region completely covers surroundings of the motor vehicle in a circumferential direction,
wherein the illumination region includes at least two illumination segments, the at least two illumination segments following one another in a spacing direction from the motor vehicle, and the at least two illumination segments being controllable independently by the control device for illumination as part of at least one light function,
wherein the illumination region is divided in a matrix-like manner by the at least two illumination segments in the circumferential direction and the spacing direction, and
wherein each illumination segment covers a predefined circumferential and spacing region, the method comprising:
evaluating input information of the at least one light function, wherein the input information comprises sensor data of at least one environment sensor of the motor vehicle;
determining illumination information, wherein the illumination information describes at least one of an environment object to be illuminated, an environment object to be highlighted, an environment direction to be indicated, or an additional information to be indicated by illuminated intervals of the illumination region in a distance direction; and
controlling the illumination device in accordance with the illumination information, wherein controlling the illumination device includes at least one of illuminating the environment object, highlighting the environment object, displaying the environment direction, or displaying the additional information,
wherein the environment object is at least one of:
a puddle,
a cyclist, the method further comprising displaying additional information, wherein the additional information is a distance recommendation,
a danger zone,
a pedestrian,
a charging device for an energy storage device of the motor vehicle,
a charging device for a tank of the motor vehicle,
a clearance zone characterizing a lateral distance to be kept clear,
a dark zone illuminated by a road light below a brightness threshold value,
an environment area located between the motor vehicle and another motor vehicle immediately ahead and/or following, wherein the environment area is displayed during a subsequent journey, or
an obstacle and/or an environment area located between the obstacle and the motor vehicle, wherein the obstacle and/or the surrounding area is displayed during a parking and/or maneuvering procedure.

9. A method for operating an illumination device of a motor vehicle, wherein the motor vehicle comprises:
the illumination device, wherein the illumination device comprises a plurality of light sources for illuminating an illumination region, the light sources being able to be simultaneously illuminated; and
a control device,
wherein the illumination region completely covers surroundings of the motor vehicle in a circumferential direction,
wherein the illumination region includes at least two illumination segments, the at least two illumination segments following one another in a spacing direction from the motor vehicle, and the at least two illumination segments being controllable independently by the control device for illumination as part of at least one light function,
wherein the illumination region is divided in a matrix-like manner by the at least two illumination segments in the circumferential direction and the spacing direction, and
wherein each illumination segment covers a predefined circumferential and spacing region, the method comprising:
evaluating input information of the at least one light function, wherein the input information comprises sensor data of at least one environment sensor of the motor vehicle;
determining illumination information, wherein the illumination information describes at least one of an environment object to be illuminated, an environment object to be highlighted, an environment direction to be indicated, or an additional information to be indicated by illuminated intervals of the illumination region in a distance direction; and
controlling the illumination device in accordance with the illumination information, wherein controlling the illumination device includes at least one of illuminating the environment object, highlighting the environment object, displaying the environment direction, or displaying the additional information,
wherein the environment direction is a turn signal direction described by a direction indicator signal for a direction indicator, wherein the environment direction is output in addition to operation of the direction indicator on the motor vehicle, the environment direction comprising at least one of:
an approach direction of a dynamic environment object,
a current direction of travel of the motor vehicle,
a direction of travel indicator described by a direction indicator signal in addition to a direction indicator on the motor vehicle,
a target direction of movement supplied by a navigation system and/or a driver assistance system, or
a direction to an environment object located outside the illumination area.

10. A method for operating an illumination device of a motor vehicle, wherein the motor vehicle comprises:
the illumination device, wherein the illumination device comprises a plurality of light sources for illuminating an illumination region, the light sources being able to be simultaneously illuminated; and
a control device,
wherein the illumination region completely covers surroundings of the motor vehicle in a circumferential direction,
wherein the illumination region includes at least two illumination segments, the at least two illumination segments following one another in a spacing direction from the motor vehicle, and the at least two illumination segments being controllable independently by the control device for illumination as part of at least one light function,
wherein the illumination region is divided in a matrix-like manner by the at least two illumination segments in the circumferential direction and the spacing direction, and
wherein each illumination segment covers a predefined circumferential and spacing region, the method comprising:
evaluating input information of the at least one light function, wherein the input information comprises sensor data of at least one environment sensor of the motor vehicle;
determining illumination information, wherein the illumination information describes at least one of an environment object to be illuminated, an environment object to be highlighted, an environment direction to be indicated, or an additional information to be indicated by illuminated intervals of the illumination region in a distance direction; and
controlling the illumination device in accordance with the illumination information, wherein controlling the illumination device includes at least one of illuminating the environment object, highlighting the environment object, displaying the environment direction, or displaying the additional information,
wherein the additional information comprises a parameter, wherein the parameter is indicated by at least one of an extension of an illuminated interval in the spacing direction, a speed of a dynamics of the illumination, a light color, or a light color profile in the spacing direction, and/or
wherein the additional information comprises an image information, wherein the image information is to be projected onto a ground of an environment and is resolved in accordance with the segmentation.

11. A method for operating an illumination device of a motor vehicle, wherein the motor vehicle comprises:
the illumination device, wherein the illumination device comprises a plurality of light sources for illuminating an illumination region, the light sources being able to be simultaneously illuminated; and
a control device,
wherein the illumination region completely covers surroundings of the motor vehicle in a circumferential direction,
wherein the illumination region includes at least two illumination segments, the at least two illumination segments following one another in a spacing direction from the motor vehicle, and the at least two illumination segments being controllable independently by the control device for illumination as part of at least one light function,
wherein the illumination region is divided in a matrix-like manner by the at least two illumination segments in the circumferential direction and the spacing direction, and
wherein each illumination segment covers a predefined circumferential and spacing region, the method comprising:
evaluating input information of the at least one light function, wherein the input information comprises sensor data of at least one environment sensor of the motor vehicle;
determining illumination information, wherein the illumination information describes at least one of an environment object to be illuminated, an environment object to be highlighted, an environment direction to be indicated, or an additional information to be indicated by illuminated intervals of the illumination region in a distance direction; and
controlling the illumination device in accordance with the illumination information, wherein controlling the illumination device includes at least one of illuminating the environment object, highlighting the environment object, displaying the environment direction, or displaying the additional information, wherein the additional information includes:
a warning information, wherein the warning information relates to at least one of an attempted theft, a detected pedestrian, or an imminent departure of the motor vehicle,
a reminder information, wherein the reminder information relates to at least one of an action to be performed on the motor vehicle,
a charging information relating to a charging process and/or refueling process, wherein the charging information comprises a state of charge and/or a filling state as a parameter, and/or wherein the charging information indicates a start of charging and/or completion of charging,
an emergency information, wherein the emergency information includes at least one of an extended hazard warning light or a panic light, and/or
a future planned trajectory of the motor vehicle or a recommended trajectory of the motor vehicle, wherein the future planned trajectory and/or the recommended trajectory implements a lane merge assistant or lane change assistant.

12. The method according to claim 5, further comprising:
determining control information in accordance with the illumination information, wherein the control information describes at least one of a spatial illumination pattern or a temporal illumination pattern.

13. The method according to claim 5, wherein a light intensity of the at least two illumination segments is selected as a function of an input information describing the ambient brightness.

14. A motor vehicle comprising:
an illumination device, wherein the illumination device comprises a plurality of light sources for illuminating an illumination region, the light sources being able to be simultaneously illuminated; and
a control device,
wherein the illumination region completely covers surroundings of the motor vehicle in a circumferential direction, wherein the illumination region includes at least two illumination segments, the at least two illumination segments following one another in a spacing direction from the motor vehicle, and the at least two illumination segments being controllable independently by the control device for illumination as part of at least one light function, wherein the illumination region is divided in a matrix-like manner by the at least two illumination segments in the circumferential direction and the spacing direction, wherein each illumination segment covers a predefined circumferential and spacing region, and wherein the control device is configured to:

evaluate input information of the at least one light function, wherein the input information comprises sensor data of at least one environment sensor of the motor vehicle;

determine illumination information, wherein the illumination information describes at least one of an environment object to be illuminated, an environment object to be highlighted, an environment direction to be indicated, or an additional information to be indicated by illuminated intervals of the illumination region in a distance direction;

control the illumination device in accordance with the illumination information, wherein controlling the illumination device includes at least one of illuminating the environment object, highlighting the environment object, displaying the environment direction, or displaying the additional information; and determine control information in accordance with the illumination information, wherein the control information describes at least one of a spatial illumination pattern or a temporal illumination pattern, wherein the spatial or temporal illumination pattern comprises at least one of spatially varying light intensities, temporally varying light intensities, spatially varying light colors, or temporally varying light colors, or wherein the spatial or temporal illumination pattern is retrieved at least partially from a database of predefined illumination patterns; or wherein the spatial or temporal illumination pattern is determined at least partially based on a personalization information provided by a user.

15. A motor vehicle comprising:

an illumination device, wherein the illumination device comprises a plurality of light sources for illuminating an illumination region, the light sources being able to be simultaneously illuminated; and a control device, wherein the illumination region completely covers surroundings of the motor vehicle in a circumferential direction, wherein the illumination region includes at least two illumination segments, the at least two illumination segments following one another in a spacing direction from the motor vehicle, and the at least two illumination segments being controllable independently by the control device for illumination as part of at least one light function, wherein the illumination region is divided in a matrix-like manner by the at least two illumination segments in the circumferential direction and the spacing direction, wherein each illumination segment covers a predefined circumferential and spacing region, and wherein the control device is configured to:

evaluate input information of the at least one light function, wherein the input information comprises sensor data of at least one environment sensor of the motor vehicle;

determine illumination information, wherein the illumination information describes at least one of an environment object to be illuminated, an environment object to be highlighted, an environment direction to be indicated, or an additional information to be indicated by illuminated intervals of the illumination region in a distance direction; and control the illumination device in accordance with the illumination information, wherein controlling the illumination device includes at least one of illuminating the environment object, highlighting the environment object, displaying the environment direction, or displaying the additional information, wherein illuminating the environment object and/or highlighting the environment object comprises at least one of:

illuminating illumination segments covering the environment object brighter;

illuminating illumination segments covering the environment object in a different light color than surroundings of the environment object; or displaying the environment direction comprising at least one of:

illuminating illumination segments that follow one another in the environment direction differently from one another, illuminating illumination segments that follow one another in the environment direction in a temporally dynamic sequence, or illuminating illumination segments that follow one another in the environment direction differently from illumination segments that are adjacent to respective illumination segments in the circumferential direction and/or the spacing direction.

16. A motor vehicle comprising:

an illumination device, wherein the illumination device comprises a plurality of light sources for illuminating an illumination region, the light sources being able to be simultaneously illuminated; and a control device, wherein the illumination region completely covers surroundings of the motor vehicle in a circumferential direction, wherein the illumination region includes at least two illumination segments, the at least two illumination segments following one another in a spacing direction from the motor vehicle, and the at least two illumination segments being controllable independently by the control device for illumination as part of at least one light function, wherein the illumination region is divided in a matrix-like manner by the at least two illumination segments in the circumferential direction and the spacing direction, wherein each illumination segment covers a predefined circumferential and spacing region, and wherein the control device is configured to:

evaluate input information of the at least one light function, wherein the input information comprises sensor data of at least one environment sensor of the motor vehicle;

determine illumination information, wherein the illumination information describes at least one of an environment object to be illuminated, an environment object to be highlighted, an environment direction to be indicated, or an additional information to be indicated by illuminated intervals of the illumination region in a distance direction;

control the illumination device in accordance with the illumination information, wherein controlling the illumination device includes at least one of illuminating the environment object, highlighting the environment object, displaying the environment direction, or displaying the additional information, wherein the environment object is at least one of:

a puddle, a cyclist, the control device being further configured to display additional information, wherein the additional information is a distance recommendation, a danger zone, a pedestrian, a charging device for an energy storage device of the motor vehicle, a charging device for a tank of the motor vehicle, a clearance zone characterizing a lateral distance to be kept clear, a dark zone illuminated by a road light below a brightness threshold value, an environment area located between the motor vehicle and another motor vehicle immediately ahead and/or following, wherein the environment area is displayed during a subsequent journey, or an obstacle and/or an environment area located between the obstacle and the motor vehicle, wherein the obstacle and/or the surrounding area is displayed during a parking and/or maneuvering procedure.

17. A motor vehicle comprising:

an illumination device, wherein the illumination device comprises a plurality of light sources for illuminating an illumination region, the light sources being able to be simultaneously illuminated; and a control device, wherein the illumination region completely covers surroundings of the motor vehicle in a circumferential direction, wherein the illumination region includes at least two illumination segments, the at least two illumination segments following one another in a spacing direction from the motor vehicle, and the at least two illumination segments being controllable independently by the control device for illumination as part of at least one light function, wherein the illumination region is divided in a matrix-like manner by the at least two illumination segments in the circumferential direction and the spacing direction, wherein each illumination segment covers a predefined circumferential and spacing region, and wherein the control device is configured to:

evaluate input information of the at least one light function, wherein the input information comprises sensor data of at least one environment sensor of the motor vehicle;

determine illumination information, wherein the illumination information describes at least one of an environment object to be illuminated, an environment object to be highlighted, an environment direction to be indicated, or an additional information to be indicated by illuminated intervals of the illumination region in a distance direction; and control the illumination device in accordance with the illumination information, wherein controlling the illumination device includes at least one of illuminating the environment object, highlighting the environment object, displaying the environment direction, or displaying the additional information, wherein the environment direction is a turn signal direction described by a direction indicator signal for a direction indicator, wherein the environment direction is output in addition to operation of the direction indicator on the motor vehicle, the environment direction comprising at least one of:

an approach direction of a dynamic environment object, a current direction of travel of the motor vehicle, a direction of travel indicator described by a direction indicator signal in addition to a direction indicator on the motor vehicle, a target direction of movement supplied by a navigation system and/or a driver assistance system, or a direction to an environment object located outside the illumination area.

18. A motor vehicle comprising:

an illumination device, wherein the illumination device comprises a plurality of light sources for illuminating an illumination region, the light sources being able to be simultaneously illuminated; and a control device, wherein the illumination region completely covers surroundings of the motor vehicle in a circumferential direction, wherein the illumination region includes at least two illumination segments, the at least two illumination segments following one another in a spacing direction from the motor vehicle, and the at least two illumination segments being controllable independently by the control device for illumination as part of at least one light function, wherein the illumination region is divided in a matrix-like manner by the at least two illumination segments in the circumferential direction and the spacing direction, wherein each illumination segment covers a predefined circumferential and spacing region, and wherein the control device is configured to:

evaluate input information of the at least one light function, wherein the input information comprises sensor data of at least one environment sensor of the motor vehicle;

determine illumination information, wherein the illumination information describes at least one of an environment object to be illuminated, an environment object to be highlighted, an environment direction to be indicated, or an additional information to be indicated by illuminated intervals of the illumination region in a distance direction; and control the illumination device in accordance with the illumination information, wherein controlling the illumination device includes at least one of illuminating the environment object, highlighting the environment object, displaying the environment direction, or displaying the additional information, wherein the additional information comprises a parameter, wherein the parameter is indicated by at least one of an extension of an illuminated interval in the spacing direction, a speed of a dynamics of the illumination, a light color, or a light color profile in the spacing direction, and/or wherein the additional information comprises an image information, wherein the image information is to be projected onto a ground of an environment and is resolved in accordance with the segmentation.

19. A motor vehicle comprising:

an illumination device, wherein the illumination device comprises a plurality of light sources for illuminating an illumination region, the light sources being able to be simultaneously illuminated; and a control device, wherein the illumination region completely covers surroundings of the motor vehicle in a circumferential direction, wherein the illumination region includes at least two illumination segments, the at least two illumination segments following one another in a spacing direction from the motor vehicle, and the at least two illumination segments being controllable independently by the control device for illumination as part of at least one light function, wherein the illumination region is divided in a matrix-like manner by the at least two illumination segments in the circumferential direction and the spacing direction, wherein each illumination segment covers a predefined circumferential and spacing region, and wherein the control device is configured to:

evaluate input information of the at least one light function, wherein the input information comprises sensor data of at least one environment sensor of the motor vehicle;

determine illumination information, wherein the illumination information describes at least one of an environment object to be illuminated, an environment object to be highlighted, an environment direction to be indicated, or an additional information to be indicated by illuminated intervals of the illumination region in a distance direction; and control the illumination device in accordance with the illumination information, wherein controlling the illumination device includes at least one of illuminating the environment object, highlighting the environment object, displaying the environment direction, or displaying the additional information, wherein the additional information includes:

a warning information, wherein the warning information relates to at least one of an attempted theft, a detected pedestrian, or an imminent departure of the motor vehicle, a reminder information, wherein the reminder information relates to at least one of an action to be performed on the motor vehicle, a charging information relating to a charging process and/or refueling process, wherein the charging information comprises a state of charge and/or a filling state as a parameter, and/or wherein the charging information indicates a start of charging and/or completion of charging, an emergency information, wherein the emergency information includes at least one of an extended hazard warning light or a panic light, and/or a future planned trajectory of the motor vehicle or a recommended trajectory of the motor vehicle, wherein the future planned trajectory and/or the recommended trajectory implements a lane merge assistant or lane change assistant.

\* \* \* \* \*